United States Patent [19]

Fleming et al.

[11] Patent Number: 4,775,401
[45] Date of Patent: Oct. 4, 1988

[54] METHOD OF PRODUCING AN OPTICAL FIBER

[75] Inventors: Debra A. Fleming, Leonia; David W. Johnson, Jr., Pluckemin; John B. MacChesney, Lebanon; Frederick W. Walz, Jr., Plainfield, all of N.J.

[73] Assignee: American Telephone and Telegraph Company, AT&T Bell Laboratories, Murray Hill, N.J.

[21] Appl. No.: 63,196

[22] Filed: Jun. 18, 1987

[51] Int. Cl.⁴ .................................. C03B 37/023
[52] U.S. Cl. ................................. 65/3.11; 65/13; 65/18.1
[58] Field of Search ............ 65/2, 3.11, 3.12, 17, 65/18.1, 13

[56] References Cited

U.S. PATENT DOCUMENTS

| | | | |
|---|---|---|---|
| 3,782,982 | 1/1974 | Pierson et al. | 106/75 |
| 4,419,115 | 12/1983 | Johnson et al. | 65/3.12 |
| 4,579,571 | 4/1986 | Hicks | 65/3.12 |
| 4,605,428 | 8/1986 | Johnson et al. | 65/2 |
| 4,643,751 | 2/1987 | Abe | 65/3.12 |
| 4,648,891 | 3/1987 | Abe | 65/3.12 |
| 4,680,046 | 7/1987 | Matsuo et al. | 65/17 |

OTHER PUBLICATIONS

*Proceedings of IOOC-ECOC* (1985) by R. Dorn et al, pp. 69–72.
*Glass Engineering Handbook*, McGraw Hill, 1958, (title page and p. 470).
*Phase Equilibria Among Oxides in Steelmaking*, Addison Wesley (1965) by A. Muan et al, (title page and p. 26).
*Tech. Digest of OFC/IOOC* (1987) by J. B. MacChesney et al, (title page and paper MH2).

Primary Examiner—Robert L. Lindsay
Attorney, Agent, or Firm—Eugen E. Pacher

[57] ABSTRACT

The disclosed method of producing optical fiber comprises providing a silica-based glass rod of diameter D that comprises a core region of effective diameter d surrounded by cladding material (D/d typcially > 2) and a silica-based porous jacketing tube, inserting the glass core rod into the porous tube, consolidating the porous material and sintering the jacketing tube onto the core rod such that a substantially pore-free optical fiber preform results. Fiber is then drawn from the preform in the conventional manner. Consolidation and sintering is carried out at a temperature below the softening temperature of the material, typically < 1600° C. In a preferred embodiment, the porous tube is produced by a sol/gel process that comprises mixing colloidal silica (surface area 5–100 m²/g) and water, adding quaternary ammonium hydroxide to the sol such that a pH in the range 11–14 results, lowering the pH into the range 4–11 by addition of methyl or ethyl formate, casting the sol into an appropriate mold and permitting it to gel. The relatively low processing temperature is an advantageous feature of the inventive process that, inter alia, makes it easier to maintain the fiber core concentric with the cladding.

13 Claims, 5 Drawing Sheets

METHOD OF PRODUCING AN OPTICAL FIBER

BACKGROUND OF THE INVENTION

This invention pertains to methods for producing silica-based optical fibers.

FIELD OF THE INVENTION

In recent years optical fiber technology has progressed such that today optical fiber is the preferred medium for new voice, image or data inter-city communication links. On the other hand, optical fiber has not yet made substantial inroads into the subscriber loop portion of the telephone network. In order to make possible more widespread use of optical fiber in the local loop, it is generally thought to be essential that fiber costs be reduced.

As is well known, optical fibers in use today for communication purposes are almost exclusively silica-based fibers in which the optically active portion of the fiber consists of material that is formed by vapor deposition (e.g., by MCVD, VAD, PCVD, or OVPO) involving reacting appropriate precursor gases. Such material will be herein referred to as "deposited" material. The optically active portion of the fiber is herein that part of an optical fiber which contains essentially all, typically more than 99%, or even more than 99.9%, of the guided optical energy at the operating wavelength of the fiber. The optically active portion of the fiber comprises a central portion (the core) having a relatively high refractive index, the core being contactingly surrounded by a region of relatively low refractive index, the deposited cladding.

The glass of the optically active region of the fiber generally must have low optical loss. All of the previously referred to vapor deposition processes can produce glass of exceedingly high purity; however, the rates of glass formation are typically relatively low, and the resulting glass therefore is relatively costly. The optically active portion of optical fiber typically is only a small part of the total fiber cross section, since optical fiber frequently comprises overcladding or jacketing of lower purity than the deposited cladding. Such jacketing material is typically derived from a substrate tube (in MCVD or PCVD) or from an overcladding tube (in VAD or OVPO).

Figure 3:
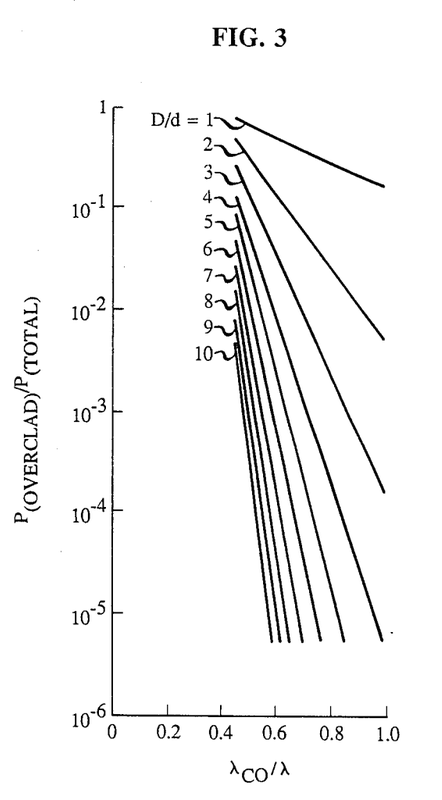
FIG. 3 shows the fraction of the total power that extends into the jacketing material, for an exemplary single mode optical fiber.

The tubes that are being used as substrate or overcladding tubes are generally fused quartz. Exemplarily, the material of such tubes has an optical loss in the region of 100 db/km or more, whereas the loss of the deposited material may be as low as 0.2–1 db/km. As a consequence of the relatively high loss of currently available substrate and overcladding material, it is typically necessary to provide a relatively thick deposited cladding layer. This is generally expressed in terms of a ratio D/d, where D is the outside diameter of the deposited cladding region of the fiber, and d is the (effective) core diameter of the fiber. For instance, if the added loss due to the overcladding material is to limited to 0.01 db/km than only $10^{-4}$ or $10^{-2}$ of the total optical power in the fiber may extend into the overcladding material if that material has a loss of 100 db/km or 1 db/km, respectively. All else being equal, the former case requires a substantially greater D/d than the latter. It is thus in general advantageous to be able to provide relatively low loss silica overcladding material, e.g., silica tubes. However, in order to be commercially useful, such silica must be producible at relatively low cost. FIG. 3 shows the power fraction in the overcladding as a function of (normalized) wavelength $\lambda_{co}/\lambda$, for a range of D/d, for an exemplary step profile single mode fiber, with $\lambda$ being the wavelength, and $\lambda_{co}$ the cut-off wavelength of the fiber.

The prior art knows several processes that potentially can be used to relatively inexpensively produce silica-based glass tubes (and other bodies). Among these is the so-called sol-gel technique (see for instance, U.S. Pat. No. 4,419,115 and U.S. Pat. No. 4,605,428). An intermediate product in the sol-gel process and other herein relevant glass making processes is a porous body that can be transformed into a substantially pore-free glass body by appropriate heat treatment.

A glass tube produced from a porous tubular body can be used as an overcladding tube in the conventional manner. This requires collapsing the tube onto a glass rod at or above the "softening" temperature of the tube, exemplarily above about 2000° C. (preform manufacturing processes involving collapse of a tubular body onto a glass rod will be referred to as "rod-in-tube" processes). Not only is this high temperature tube collapse energy intensive and therefore costly but it also may result in increased signal loss in the resulting fiber. For instance, it is believed that some species of point defects can be created in doped silica during high temperature processing. These point defects can cause added signal loss, and their introduction into the optically active region of the fiber is therefore undesirable. Furthermore, in rod-in-tube processes that involve shrinking a glass tube onto a glass rod it is frequently difficult to maintain the concentricity of the core within the preform to the degree required for optical fiber production.

In view of the above, it will be apparent that a method for producing an optical fiber preform by the "rod-in-tube" method that does not involve collapsing the overcladding tube onto the rod at or above the softening temperature of the glass, and that therefore, inter alia, substantially avoids the concentricity problem of the prior art method, would be very desirable. This application discloses such a method. The inventive method also offers the potential of low cost production of relatively low loss silica overcladding material, such that fibers having low D/d and low to moderate (e.g., 0.15–5 db/km, preferably less than 1 db/km) loss can be produced.

GLOSSARY AND DEFINITIONS

The "softening" temperature of a silica-based body herein is the temperature at which a uniform glass fiber of the same composition, 0.5 to 1.0 mm in diameter and 22.9 cm in length, elongates under its own weight at a rate of 1 mm per min when the upper 10 cm of its length is heated in a prescribed furnace. For a glass of density near 2.5, this temperature corresponds to a viscosity of $10^{7.6}$ poise. This definition is identical to the definition of the softening point given in E. B. Shand, *Glass Engineering Handbook*, McGraw Hill (1958) page 470.

SUMMARY OF THE INVENTION

In broad terms the invention is a method of manufacturing an optical fiber that comprises providing a silica-based (i.e., typically >80% by weight $SiO_2$) glass rod and a silica-based porous tubular body, inserting the rod into the tubular body, heat treating the combination at a temperature (or temperatures) below the softening temperature of the material such that a unitary, substantially pore-free glass body (the preform) results, and drawing the fiber from the preform.

The glass rod (frequently referred to as the "core rod") typically is formed using a vapor deposition process, and comprises a central region of relatively high refractive index that is contactingly surrounded by a region of relatively low refractive index. The porous tubular body (frequently referred to herein as the "overcladding" or "jacketing" tube) typically has a density in the range 10-80% of the theoretical density of the material and can be produced by any appropriate process, preferably a sol/gel process. The "theoretical" density of the material essentially corresponds to the density of the fully consolidated material. Possible processes for producing the porous tube include high rate soot deposition on a mandrel, leaching of a multiphase glass tube to result in a porous glass tube (similar to VYCOR glass), or compression of silica powder (R. Dorn et al, *Proceedings of IOOC-ECOC* 1985, pages 69-72). The porous tubular body can be doped (e.g., with fluorine) or undoped, and can have a radially constant or nonconstant refractive index.

The porous tube has to have mechanical properties that permit drying, consolidation, and sintering of the tube to the rod without fracturing of the tube. We have found that, inter alia, a sol/gel process that uses quaternary ammonium hydroxide and relatively large silica particles (surface area 5-100 $m^2/gm$, preferably greater than about 20 $m^2/gm$) can be used to produce porous tubes that can advantageously be used to practice the invention. In other sol/gel processes other particle sizes may be found to be more advantageous. The particle size is frequently not the only process variable that affects the mechanical properties of porous tubes produced by a sol/gel process. For instance, the constituents of the sol typically are chosen such that the sol has a pH in the range 11-14, followed by introduction of a compound (or compounds) that results in a lowering of the pH into the range 4-11 (preferably 8-10). Exemplarily, the sol comprises quaternary ammonium hydroxide (e.g., alkyl ammonium hydroxides such as methyl, ethyl, or butyl ammonium hydroxide) or other suitable base, and the pH is lowered by addition of alkyl formate such as methyl, ethyl, or butyl formate or other suitable ester.

We have also found that frequently it is advantageous to arrange the heat treatment conditions of the rod-in-tube combination such that consolidation of the tube material and sintering of the tube onto the rod take place progressively along the combination. This is, for instance, desirable if consolidation of the porous tube would yield a bore that is slightly smaller (e.g., by up to about 10%) than the outside diameter of the core rod. Otherwise, shrinkage can bring the tube into contact with the rod before the viscosity of the tube material has decreased to a value which permits flow of the tube material.

At least in some cases the diameter of the core rod and the inner diameter (and possibly other characteristics such as the density) of the porous tube are advantageously chosen such that the consolidation of all (or of a given axial portion) of the tube is completed at substantially the same time as the inner diameter of the tube (or of the portion of the tube) has decreased to the diameter of the core rod, and thereby sinters tightly onto the rod without experiencing excessive strains. Both of the above practices tend to reduce the stress on the tube during sintering of the tube to the rod.

As will be appreciated by those skilled in the art, the consolidation temperature of a porous silica-based body is not only strongly dependent on the composition of the body but also depends on the surface area of the porous silica. For instance, porous silica produced using very small particle size colloidal silica (surface area 800 $m^2/gm$) consolidates at 1100° C., whereas porous silica produced from 5 $m^2/gm$ colloidal silica may require 1550° C. for consolidation. Thus, determination of appropriate process conditions such as heating rates, diameter sizes for tube/rod combinations, and consolidation temperatures may require minor experimentation.

An optical fiber preform produced according to the invention has a central portion (comprising the "core" and some cladding) that is derived from the core rod and a peripheral portion that is derived from the porous tubular body. After completion of the preform formation an optical fiber is drawn from the preform in the conventional manner. The high index region of the core rod results in the core of the fiber (of effective diameter d), the low index region of the core rod results in the inner cladding of the fiber (of outer diameter D), and the overcladding tube results in the jacketing of the fiber that contactingly surrounds the inner cladding and typically extends to the boundary of the fiber. Typically the jacketing material constitutes a substantial portion (typically > 50 or even 95% or more) of the total cross section of the fiber. The above-described fiber typically is coated with one or more protective polymer layers.

The inventive method has several advantages over prior art rod-in-tube processes that involve shrinking a glass tube onto a glass rod. For instance, shrinking of a silica glass tube onto the core rod requires substantially higher temperatures (typically greater than 2000° C.) than consolidating of a porous silica tube and sintering thereof to the core rod (typically less than 1600° C.). In the prior art processes the glass overcladding tube is frequently being distorted during fusion of the tube to the rod, due to the effects of surface tension, resulting in lowered concentricity of the core with respect to the surface of the fiber. The inventive process, being carried out at substantially lower temperature, is substantially free of such distorting effects. By carrying out at least a part of the consolidation of the porous tube in an atmosphere that contains $Cl_2$ and/or a fluorine-containing species (and that preferably is substantially free of oxygen), impurities (e.g., hydroxyls, alkalis, alkaline earths, transition metals) can be removed from the tube material, resulting in relatively low loss jacketing material. This in turn may permit use of relatively low D/d (preferably less than about 6), with the attendant potential for cost reduction, and may even permit use of relatively impure (and therefore less costly) starting materials in the production of the porous tube. No such purification during collapse is possible in the above referred to prior art processes. Furthermore, low temperature processing minimizes diffusion of remaining undesirable ions from the overcladding material into the core rod and prevents formation of undesirable defects.

DETAILED DESCRIPTION OF SOME PREFERRED EMBODIMENTS

Figure 1:
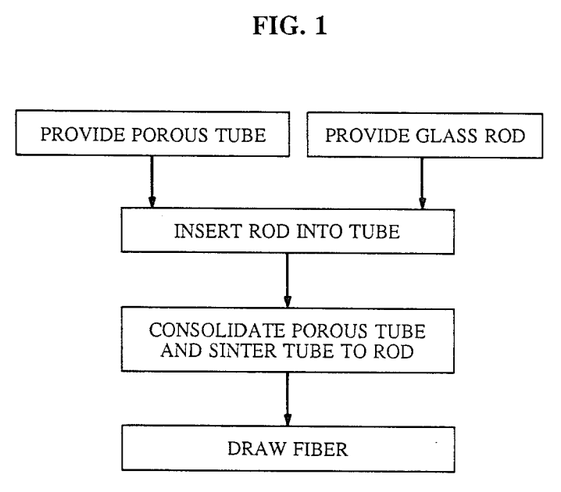
FIG. 1 depicts the inventive process inform of a flow chart.

FIG. 1 is a flow chart showing the major steps of the inventive process. Among these steps are providing a porous silica-based tube and a silica-based core rod.

Figure 2:
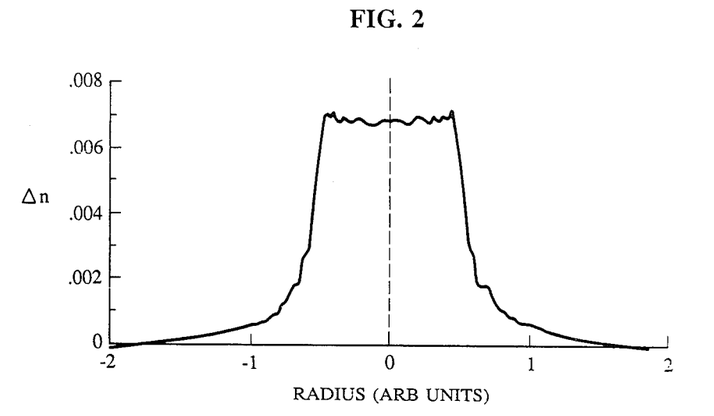
FIG. 2 shows the refractive index profile of a core rod useful in the practice of the invention.

The core rod can be made by any appropriate glass-forming process that can produce a low loss rod having the desired radially varying refractive index profile. The effective index $n_c$ of the core region of the rod typically is greater than or equal to $n_o$, the refractive index of vitreous silica, but in principle could also be less than $n_o$. The refractive index $n_1$ of the inner cladding region of the rod typically is equal to or less than $n_o$, but in principle could also be greater than $n_o$. In all cases, however, $n_c > n_1$. The index profile of an exemplary core rod is shown in FIG. 2, where $\Delta n = n - n_o$, with n being the refractive index.

Neither the refractive index of the central region of the rod nor that of the surrounding core region needs to be constant as a function of the radius, and, exemplarily, the index of the inner region is graded (e.g., "triangular") so as to yield fiber having desired transmission characteristics. Furthermore, there may exist index variations (e.g., a central dip) caused by the process used to make the core rod. Typically the diameter of the rod is at least twice ($D/d \geq 2$) the effective diameter of the core region, with 3 or 4 times being currently preferred. The refractive index profile of an exemplary core rod is shown in FIG. 2. In principle, it is also possible to use a glass rod consisting only of core material. However, this typically results in fiber having relatively high loss and is therefore not preferred. The refractive index profile of an exemplary core rod is shown in FIG. 2.

The core rod can be produced by any appropriate process such as VAD, OVPO, MCVD or PCVD, with the latter two resulting in rods in which the inner deposited glass (typically comprising core as well as cladding material) is surrounded by tube-derived glass. In principle the core rod could also be a porous body. However, this is currently not preferred. Prior to sintering of the overcladding tube to the core rod it is frequently desirable to prepare the surface of the core rod, e.g., by cleaning with appropriate solvents, and fire polishing and/or etching. The surface treatment may have some effect on the loss of the fiber drawn from the inventive preform, as is illustrated below.

The porous tubular body can be made by any appropriate process that can produce a body of the requisite purity and mechanical strength that can be consolidated into a substantially pore-free glass. Currently preferred processes include some sol/gel processes, to be discussed in detail below. Among other possible processes are deposition of silica "soot" onto a removable mandrel, or by leaching of a multi-component glass.

We have found that not all sol/gel processes can produce porous tubes that are useful in the practice of the invention, typically due to fracture of the tube during drying, consolidation, or sintering to the glass rod. A currently preferred sol/gel process uses relatively large silica particles (nominal surface area 5–100 $m^2/gm$).

Particles useful in the practice of the invention may be fumed silica, but can also be produced by other processes such as comminution of soot bodies or of bodies produced by a sol/gel process, or by precipitation from a basic alkoxide solution. The particles typically are dispersed in an alkaline aqueous medium (pH in the approximate range 11–14), e.g., water and tetramethyl ammonium hydroxide. Optionally the resulting sol is milled or otherwise treated to improve homogeneity. The sol is then typically cast into an appropriate mold and allowed to gel. In especially preferred embodiments the pH of the sol is caused to change gradually to a value within the approximate range 4–11, preferably 8–10. Exemplarily this is done by addition of methyl or ethyl formate to the sol. After gelation has occurred the resulting tubular body is typically removed from the mold and dried, resulting in a porous tube that can be used in the inventive process. However, porous tubes that can be used in the practice of the invention can be produced also by sol/gel processes that do not involve a reduction of the pH of the sol. For instance, such tubes can be produced by dispersing appropriately sized colloidal silica particles in water and maintaining the sol in an appropriate mold until gelation occurs (typically after periods of hours or even days).

Figure 5:
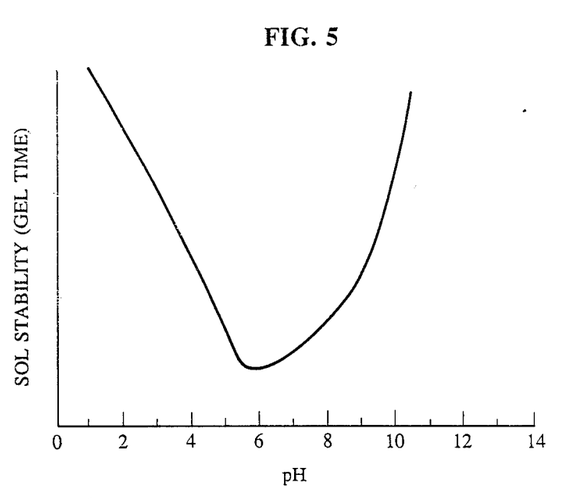
FIG. 5 shows schematically an exemplary relationship between sol stability and pH.

FIG. 5 presents a curve which schematically depicts the relationship between pH and sol stability in exemplary colloidal silica-water sols. It is currently believed that in a sufficiently alkaline sol dissolution of silica occurs, and that reduction of the pH of such a sol causes precipitation of the dissolved silica, with the precipitated silica preferentially deposited at sites having a negative radius of curvature (i.e., forming "necks" connecting adjacent silica particles). The described mechanism may be responsible for the relatively high mechanical strength of porous silica bodies produced by the above described preferred sol/gel process. However, bodies produced by other processes may also have acceptable properties. Furthermore, the invention does not depend on the correctness of the above described theoretical mechanism.

Figure 6:
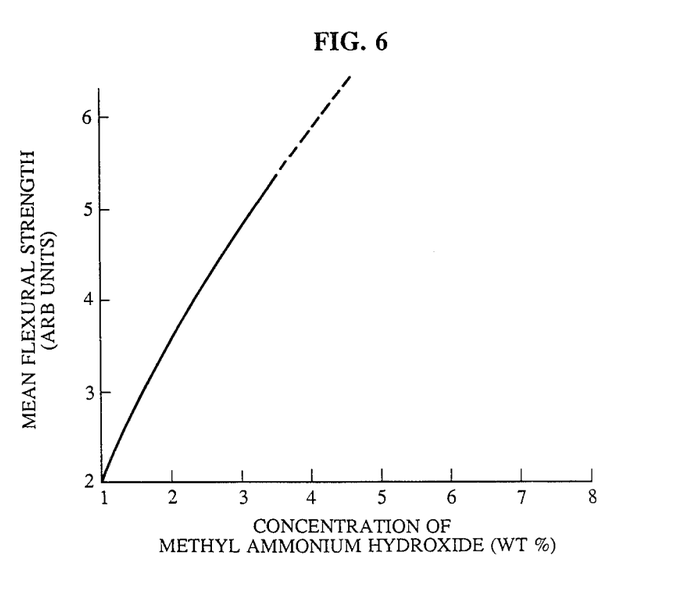
FIG. 6 gives exemplary data on the dependence of flexural strength of sol/gel-produced porous silica on the concentration of methyl ammonium hydroxide in the sol.
Figure 7:
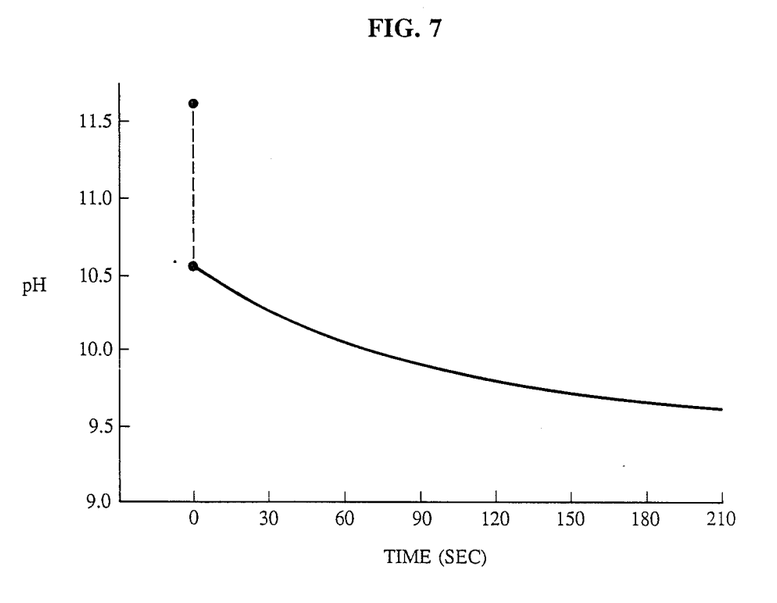
FIG. 7 depicts the pH of an exemplary sol as a function of time after addition of methyl formate to the sol.

FIG. 6 illustrates the relationship between alkalinity of the sol (expressed as the concentration of tetramethyl ammonium hydroxide in the sol) and the flexural strength of the porous silica body produced from the sol, for exemplary colloidalsilica-water sols. FIG. 7 illustrates the change of pH of an exemplary sol as a function of time, after addition of methyl formate to the sol (50 g sample, taken from a batch consisting of 300 g $SiO_2 + 375$ g $H_2O + 38$ g 25% tetramethyl ammonium hydroxide). Prior to addition of the formate the pH was 11.54. To the sample was added 0.445 g (32 drops) of the formate, with $t = o$ corresponding to completion of addition.

Since drying of the gel body as well as sintering of the dried porous body results in some shrinkage, it is necessary to select an appropriate mold and/or glass rod diameter. If the drying shrinkage $\Delta L_d$ is defined as $(L_{wet} - L_{dry})/L_{wet}$, where $L_{wet}$ and $L_{dry}$ are a linear dimension of the gel body before and after drying, respectively, and D is the diameter of the glass rod that is to be used, then the bore diameter of the wet gel tube has to be greater than $D/(1 - \Delta L_d)$. Similarly, if the total shrinkage $\Delta L_t$ is defined as $(L_{wet} - L_{fired})L_{wet}$, where $L_{fired}$ is the linear dimension after drying and consolidating, then the bore diameter of the wet gel tube has to be less than $D/(1 - \Delta L_t)$. The former condition assures that the dried tube fits over the core rod, and the latter that the porous tube will shrink tightly onto the rod. Both $\Delta L_d$ and $\Delta L_t$ depend on material parameters such as the density of the body, and a minor amount of experimentation will typically be required to determine the optimal dimensions of the gel tube.

After preliminary drying the gel tube is typically further dehydrated by maintaining the tube at elevated temperature (e.g., 200°-500° C.) for an extended period (e.g., 1-24 hours). Advantageously this is done in an oxygen-containing atmosphere such that organic residues are removed from the porous material. Next the tube (typically with inserted glass rod) is heated to an intermediate temperature (e.g., one or more temperatures in the range of 800°-1200° C.) and exposed to a $Cl_2$-containing atmosphere.

It is known that heating a porous silica body in a $Cl_2$-containing atmosphere can result in removal of OH from the body, and can lead to purification with respect to several transition metals. It is also known that heating of a chlorine-treated porous silica body in a fluorine-containing atmosphere can lead to replacement of absorbed chlorine by fluorine, with attendant decrease in bubble formation during heating of the resulting glass above the working temperature. See U.S. Pat. No. 4,707,174. However, chlorine and/or fluorine treatment of a porous silica body (in particular, of a porous tube according to the invention), can yield further significant advantage, as will be discussed next.

We have found that the removal of impurities from a porous silica body is substantially improved if the chlorine (or fluorine)-containing atmosphere is substantially $O_2$-free. Advantageously the ratio of $O_2$ partial pressure to the halogen (chlorine or fluorine) partial pressure is less than about $10^{-3}$, preferably less than $10^{-6}$. This typically requires that the heat treatment is carried out in a carefully sealed container, e.g., a sealed silica muffle tube. Particularly low values of the ratio can be achieved if the atmosphere comprises CO and $CO_2$, in addition to the halogen and typically an inert diluent such as He. See, for instance, A. Muan et al, *Phase Equilibria Among Oxides in Steelmaking*, Addison Wesley (1965), page 26.

Heat treatment in a substantially $O_2$-free halogen-containing atmosphere can efficiently remove not only transition metal ions but also most other members of the periodic table. In particular, such heat treatment can remove alkali metals and alkaline earths. It can also remove Group III elements such as B, Al, Ga, and In, and the Group IV elements Ge, Sn, and Pb. In general, an element will be removed if, at the given temperature and partial pressure ratio, the partial pressure of the chloride is substantially larger than $10^{-4}$ atmospheres.

By way of example, we treated several iron-containing (1% b.w. $Fe_2O_3$) porous silica bodies as follows: heated to 800° C. at a rate of 400° C./hour, maintained at 800° C. for 6 hours, heated to 1400° C. at 150° C./hour, maintained at 1400° C. for 1 hour, then cooled to room temperature. One specimen was thus treated in He, and retained its original Fe content. A second specimen was soaked at 800° C. for 3 hours in 10% $Cl_2$+90% He, followed by 3 hours in 10% $Cl_2$+10% $SiF_4$+80% He. Both these atmospheres contained less than 5 ppm $O_2$. The resulting transparent glass contained about 40 ($\pm 3$) ppb of Fe. A third specimen was soaked at 800° C. for 6 hours in 10% $Cl_2$+90% He (less than 5 ppm $O_2$). The result was essentially the same as in the second specimen. A fourth specimen was soaked at 800° C for 6 hours in 10% $Cl_2$+10% $O_2$+80% He. The resulting glass was brown and had a high Fe content ($>10^4$ ppb).

As a further example, a porous silica rod was produced by a sol-gel technique using commercially obtained fumed silica containing $1600\pm 160$ ppb of iron oxide. After heat treatment as for the second specimen above, the resulting glass contained only 140($\pm 14$) ppb of iron oxide. For comparison, a commercially available silica tube of the type used as substrate tube in optical fiber production contained 500($\pm 50$) ppb of iron oxide.

The above discussion shows that heat treatment of a porous silica body in an essentially $O_2$-free halogen-containing atmosphere can substantially reduce the concentration of most contaminating elements in the porous body before consolidation into silica glass. This has several advantageous consequences. Not only can inexpensive starting materials (e.g., commercial fumed silica) be used in the production of the porous body, but the body can be produced in a relatively "dirty" environment (e.g., using metallic stirring of the sol), and organic and/or inorganic bonding and/or gelation agents can be used in the production of the porous body. For instance, LUDOX sodium-stabilized colloidal silica could be used, despite the fact that porous silica containing even a very small amount of Na at a surface typically devitrifies during consolidation. The discussion also indicates that rigorous exclusion of $O_2$, (preferably together with addition of appropriate amounts of CO and $CO_2$ to the atmosphere) results in significantly improved removal of impurities, as compared to prior art processing that did not make special efforts to provide an essentially oxygen-free atmosphere.

Figure 4:
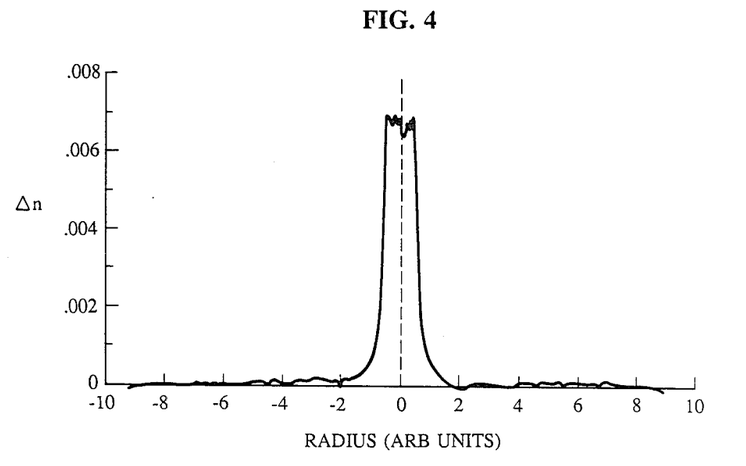
FIG. 4 shows the refractive index profile of an exemplary inventive preform.

After completion of the intermediate temperature treatment the combination (the tube with a core rod in the bore of the tube) is heated to higher temperature for consolidation. Typically the highest temperature reached is in the range 1200°-1600° C., and is always below the softening temperature of the tube material. After sintering of the tube to the rod such that a (preferably substantially pore-free) unitary glass body (the "preform") results, the preform is typically allowed to cool, and optical fiber is drawn from the preform in conventional manner. FIG. 4 shows the refractive index profile of a preform according to the invention. It is well known that fiber drawn from a preform has the same refractive index profile as the preform, with the radial coordinate appropriately scaled.

EXAMPLE I 300 g of commercially obtained colloidal silica (AEROSIL OX-50 from DEGUSSA Corp.) with a nominal surface area of 50 m$^2$/g was dispersed in water (44% $SiO_2$ by weight) using a shear blender. (OX-50 has a relatively broad distribution of particle sizes extending from about 5 to about 100 nm. Use of particles having a broad size distribution may be advantageous in some sol/gel processes). To this was added 38 g of a 25% aqueous solution of tetramethyl ammonium hydroxide and mixed. The sol was ball milled in a one liter borosilicate jar with $SiO_2$ balls for 24 hours. The sol was then evacuated to remove bubbles, 4.5 g of methyl formate was added, the sol slowly mixed and cast into tube molds (28 mm outer diameter, 5 mm inner diameter).

Within 10 minutes after pouring gelation occurred. The tubular gel bodies were removed from the molds and allowed to dry in air, resulting in porous silica tubes having about 4 mm diameter bores.

A commercially obtained silica core rod (Lightwave Technology, Van Nuys, Calif.) about 3.8 mm diameter and having an index profile substantially as shown in FIG. 2, was washed successively in trichlorethylene, isopropanol and water, and inserted into the bore of one of the porous silica tubes. The combination was then placed in a firing shroud that permits firing in a controlled atmosphere by minimizing air ingress. The shroud with the core/tube combination therein was lowered over 2 hours into the hot zone (400° C.) of a vertical furnace, and soaked at 400° C. for additional 6 hours in an oxygen atmosphere. The temperature was then ramped to 1000° C., with the atmosphere in the shroud being 84% He, 10% $O_2$, and 6% $Cl_2$. The combination was then soaked at 1000° C. for 4 hours. During the first hour the atmosphere was 94% He and 6% $Cl_2$, during the next two hours it was 90% He and 10% $O_2$, and during the last hour it was 100% He. Following the soak the combination is heated to 1400° C. in 4 hours and maintained at that temperature for 1 hour, all in 100% He. Thereafter the furnace was allowed to cool to 400° C., and the thus produced unitary glass body (preform) was removed from the furnace. The preform was then fire polished, profiled, and fiber drawn from the preform, all by procedures well known in the art. The refractive index profile of the preform was substantially as shown in FIG. 4. The fiber ($\lambda_{co} < 1.3$ μm) had loss<0.5 db/km at both 1.3 and 1.55 μm.

EXAMPLES II AND III

Two further preforms were produced and fiber drawn therefrom, substantially as described in Example I, except that, after washing, one core rod was cold etched in HF (diameter was decreased by 0.33 mm), and the other core rod was fire polished. The loss of fiber drawn from the former was substantially as that of the fiber of Example I, whereas fiber drawn from the latter preform had slightly higher loss at 1.3 μm and above, and substantially higher loss, below about 1.2 μm.

EXAMPLE IV

A fiber is produced substantially as described in Example I, except that the 4 mm diameter core rod has a 1 mm diameter $GeO_2$-doped core ($\Delta^+ = 0.27\%$) and a fluorine-doped cladding ($\Delta^- = 0.13\%$), and except that, after oxygen treatment at 1000° C., $SiF_4$ (2 cc/min) is introduced into the He flow, and the He+$SiF_4$ flow is maintained until completion of the 1400° C. soak. The fiber has loss<1 db/km at 1.3 and 1.55 μm.

EXAMPLE V

A fiber is produced substantially as described in Example I, except that the heat treatment consists of lowering the rod/tube combination in the firing shroud at 0.5 cm/min through the hot zone (1000°) of the furnace (gas flow is 1 l/min He, 100 cc/min $Cl_2$) and, after the entire combination has traversed the hot zone, raising the furnace temperature to 1400° C. and raising the combination in the shroud at 0.5 cm/min through the hot zone (atmosphere 100% He). The fiber has loss<1 db/km at 1.3 and 1.55 μm.

EXAMPLE VI

Porous silica material was produced by mixing 40 parts by weight fumed silica (CAB-O-SIL M5, nominally 200 m$^2$/g, obtained from Cabot Corp.) and 100 parts b.w. water, permitting the resulting sol to gel, drying the gel, and heat treating the porous silica material at 900° C. Fragments of this material are comminuted and redispersed with water (55 parts b.w. $SiO_2$ to 100 parts b.w. $H_2O$). To this was added 0.09 parts b.w. of a non-ionic surfactant (Kodak PHOTOFLOW 200). The dispersed sol was then cast into a mold made of concentric 50 cm long $SiO_2$ glass tubes. The inner diameter of the outer tube was 38 mm and the outer diameter of the inner tube was 7 mm. The sol was permitted to gel in the mold, the gel tube was removed from the mold and air dried. A pure silica rod (4 mm diameter) is placed into the bore of the porous silica tube, the assembly dehydrated for 16 hours at 1000° C. in a $Cl_2$-containing atmosphere, followed by fluorine treatment for 3 hours in He-0.5% $SiF_4$ at 1000° C. The porous tube is then consolidated and sintered to the core rod by heating the assembly at 200° C./hour to 1300° C. in He-5% $SiF_4$, followed by furnace cooling. This procedure results in formation of a substantially bubble-free preform having a core index equal to $n_o$ and a depressed index cladding ($\Delta^- = 0.006$). Fiber is then drawn from the preform.

EXAMPLE VII

A sol was formed and cast into the mold, substantially as in Example I, but without addition of the methyl formate to the sol. The sol did not gel.

EXAMPLE VIII

A sol was formed substantially as described in Example I, except that CAB-O-SIL M5 (nominal surface area 200 m$^2$/gm) was used instead of the AEROSIL OX-50 (nominally 50 m$^2$/gm). The sol became too viscous to mill or to mix with the methyl formate, and could not be cast.

EXAMPLE IX

A sol was prepared substantially as in Example I, except that neither the quaternary ammonium hydroxide nor the methyl formate were added. After milling, the sol was cast into the mold but did not gel.

EXAMPLE X

Tetraorthosilicate (TEOS), ethanol and water were mixed in the ratio 1:4:4. To this was added 0.9% reagent grade HCl, the solution mixed, aged overnight, and poured into a tubular mold as described in Example I. The sol was allowed to gel, the gel tube was pushed out and air dried. During the drying, the porous tube cracked. The exemplary method of producing a porous silica tube thus did not result in a tube suitable for use in the inventive method.

What is claimed is:

1. Method of producing a silica-based optical fiber comprising
    (a) inserting a silica-based glass rod into a silica-based tube having a softening temperature and heating the thus formed combination such that a unitary glass body (to be termed the "preform") results; and
    (b) drawing the optical fiber from the preform;

characterized in that the silica-based tube is a porous tube having a density in the range from about 10 to about 80% of the theoretical density of the material of the tube, (a) comprises consolidating the porous tube such that substantially pore-free glass results, and (a) is carried out such that the maximum temperature reached by the combination is lower than the softening temperature of the tube material.

2. The method of claim 1, comprising selecting the glass rod and the porous tube such that the consolidation of the porous material of any given axial segment of the tube is completed at substantially the time the inner diameter of the axial segment has decreased to the diameter of the glass rod.

3. The method of claim 1, comprising heating the combination such that the unitary body is produced by joining the tube to the glass rod progressively along the combination.

4. The method of claim 1, comprising using a silica-based porous tube that was produced by a method that comprises forming a tubular gel body.

5. The method of claim 1, wherein at least a part of (a) is carried out such that the porous material of the tube is in contact with an atmosphere that comprises a halogen selected from the group consisting of chlorine and fluorine, with the atmosphere furthermore being substantially free of oxygen.

6. The method of claim 4, wherein producing the tubular gel body comprises forming a sol comprising silica particles having a nominal surface area in the range 5-100 $m^2$/gm.

7. The method of claim 6, wherein producing the tubular gel body comprises forming the sol such that it has a pH in the range 11-14, and further comprises adding at least one pH-lowering substance to the sol such that the pH of the sol is changed to be in the range 4-11.

8. The method of claim 7, comprising providing a sol comprising water and at least one quaternary ammonium hydroxide, and wherein the pH-lowering substance is chosen from the group consisting of methyl formate and ethyl formate.

9. The method of claim 1, comprising providing a glass rod of diameter $D'$ having a central region of relatively high refractive index (the "core") and effective core diameter $d'$ that is contactingly surrounded by a region of relatively low refractive index, with $D'/d'$ being at least 2.

10. The method of claim 5, comprising maintaining the oxygen/halogen ratio at a value less than or equal to $10^{-3}$ during the part of the heating.

11. The method of claim 1, comprising providing a porous tube that contains a relatively high concentration of at least one contaminating chemical species and carrying out (a) such that the consolidated tube material has a relatively low concentration of the contaminating chemical species.

12. The method of claim 5, comprising
 (i) forming an aqueous sol comprising silica particles having a nominal surface area in the range of 20-100 $m^2$/gm and a relatively broad size distribution, the sol further comprising sufficient quaternary ammonium hydroxide to result in a pH in the range of 11-14;
 (ii) adding an alkyl formate to the sol such that a pH in the range 4-11 results; and
 (iii) the maximum temperature of step a) is at most about 1600° C.

13. The method of claim 9, comprising providing a glass rod having $D'/d' < 6$.

* * * * *